(12) United States Patent
Ning et al.

(10) Patent No.: US 11,431,955 B1
(45) Date of Patent: Aug. 30, 2022

(54) SYSTEMS AND METHODS FOR TEMPORAL ANTI-ALIASING

(71) Applicant: Facebook Technologies, LLC, Menlo Park, CA (US)

(72) Inventors: Tianxin Ning, Mountain View, CA (US); Haomiao Jiang, Sunnyvale, CA (US); Behnam Bastani, Palo Alto, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 213 days.

(21) Appl. No.: 16/702,143

(22) Filed: Dec. 3, 2019

(51) Int. Cl.
 *H04N 13/144* (2018.01)
 *H04N 13/15* (2018.01)
 *G02B 27/00* (2006.01)
 *G06T 5/00* (2006.01)
 *G06F 3/01* (2006.01)

(52) U.S. Cl.
 CPC ....... *H04N 13/144* (2018.05); *G02B 27/0025* (2013.01); *G02B 27/0093* (2013.01); *G06F 3/012* (2013.01); *G06T 5/003* (2013.01); *H04N 13/15* (2018.05)

(58) Field of Classification Search
 CPC .. H04N 13/144; H04N 13/15; G02B 27/0025; G02B 27/0093; G06F 3/012; G06T 5/003
 See application file for complete search history.

(56) References Cited

U.S. PATENT DOCUMENTS

| | | | | |
|---|---|---|---|---|
| 2008/0219654 | A1* | 9/2008 | Border | H04N 5/232123 396/89 |
| 2017/0272722 | A1* | 9/2017 | Salvi | H04N 13/122 |
| 2019/0164349 | A1* | 5/2019 | Kim | H04N 13/15 |
| 2019/0331919 | A1* | 10/2019 | Huo | G02B 27/10 |
| 2020/0184607 | A1* | 6/2020 | Hwang | G06T 5/20 |

* cited by examiner

*Primary Examiner* — Jae N Noh
(74) *Attorney, Agent, or Firm* — Foley & Lardner LLP

(57) ABSTRACT

A method for providing imagery to a user on a display includes receiving head tracking data and using the head tracking data to determine a change in an orientation of a user's head. The method also includes blending pixels of a previous frame with corresponding pixels of a current frame. The corresponding pixels of the current frame are identified using the change in the orientation of the user's head. The method also includes providing foveated imagery to the user on the display using the blended pixels and multiple tiles.

17 Claims, 5 Drawing Sheets

SYSTEMS AND METHODS FOR TEMPORAL ANTI-ALIASING

FIELD OF THE DISCLOSURE

The present disclosure relates generally to display systems. More particularly, the present disclosure relates to systems and methods for reducing artifacts (e.g., flickering) that can occur as a result of foveated rendering.

BACKGROUND

The present disclosure relates generally to augmented reality (AR) and/or virtual reality (VR) systems. AR and VR systems can be used to present various images, including two-dimensional (2D) and three-dimensional (3D) images, to a user. For example, AR or VR headsets can be used to present images to the user in a manner that is overlaid on a view of a real world environment or that simulates a virtual environment. To render convincing, life-like AR/VR images, the AR/VR systems can use eye tracking and/or head tracking to track the user's eyes or head and accordingly present images.

SUMMARY

One implementation of the present disclosure relates to a method for providing imagery to a user on a display, according to some embodiments. In some embodiments, the method includes receiving head tracking data and using the head tracking data to determine a change in an orientation of a user's head. In some embodiments, the method includes blending pixels of a previous frame with corresponding pixels of a current frame. In some embodiments, the corresponding pixels of the current frame are identified using the change in the orientation of the user's head. In some embodiments, the method includes providing foveated imagery to the user on the display using the blended pixels and multiple tiles.

Another implementation of the present disclosure relates to a head mounted display, according to some embodiments. In some embodiments, the head mounted display includes processing circuitry configured to use a change in an orientation of a user's head as measured by a head tracking sensor to identify corresponding pixels between a previous frame and a current frame. In some embodiments, the processing circuitry is configured to provide a blended frame using the corresponding pixels of the previous frame and the current frame. In some embodiments, the processing circuitry is configured to provide foveated imagery on a display to the user using the blended frame.

Another implementation of the present disclosure relates to a head wearable display system, according to some embodiments. In some embodiments, the head wearable display system includes a head tracking sensor, a wearable display, and processing circuitry. In some embodiments, the head tracking sensor is configured to measure a change in orientation of a user's head. In some embodiments, the wearable display is configured to provide imagery to a user's eye. In some embodiments, the processing circuitry is configured to blend corresponding pixels of a previous frame and a current frame using the change in the orientation of the user's head to generate a first frame. In some embodiments, the processing circuitry is configured to provide foveated imagery on the wearable display to the user using the first frame.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Overview

Figure 1:
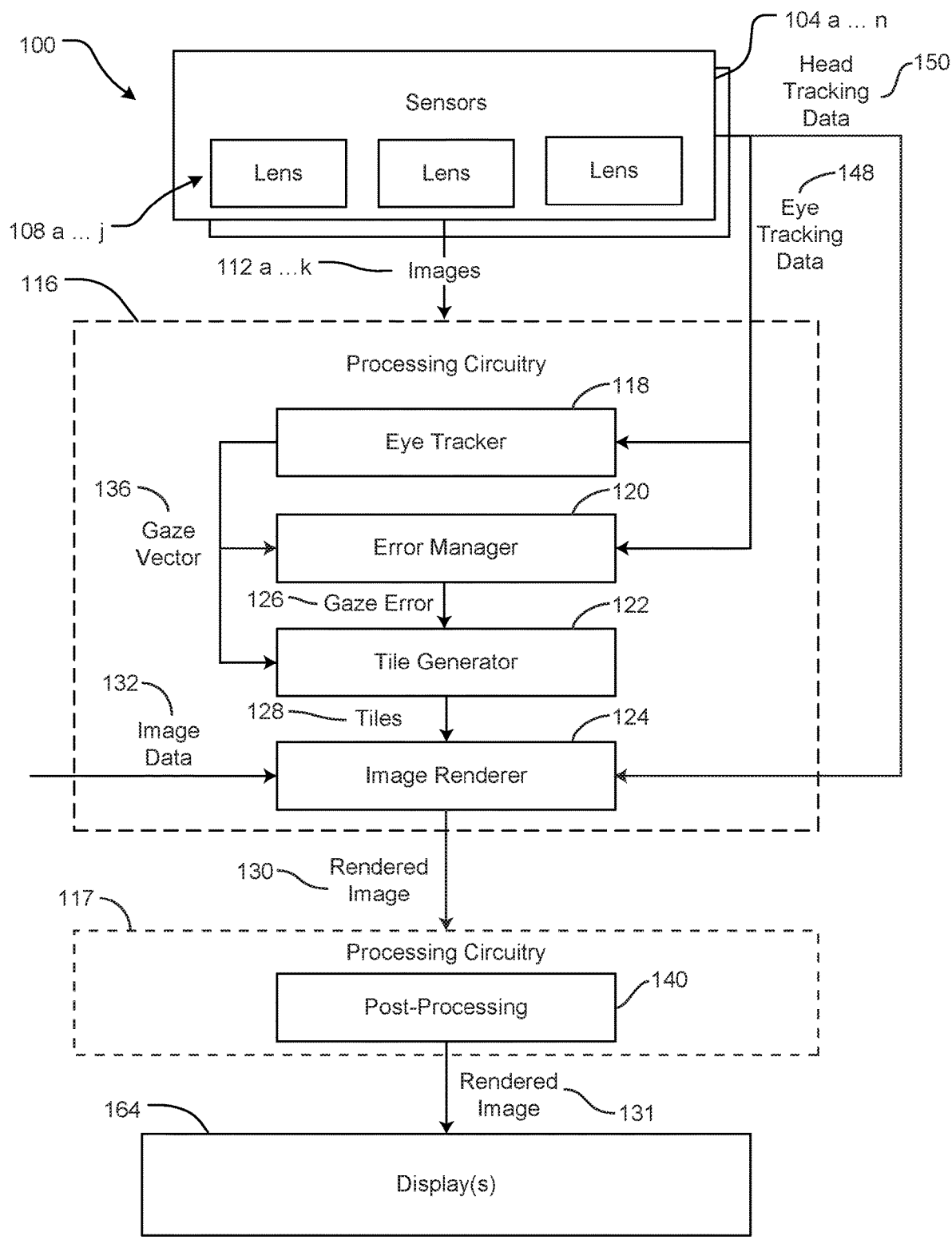
FIG. 1 is a block diagram of a display system, according to some embodiments.

Referring generally to the FIGURES, a head mounted or head wearable display system may include processing circuitry, an orientation sensor (e.g., an inertial measurement unit, a gyroscope, etc.), and a display. In some embodiments, the orientation sensor is configured to measure a current orientation of the user's head. The head mounted or head wearable display system may be configured as a virtual reality head set, an augmented reality head set, or a mixed reality head set. In some embodiments, the display is a combiner (e.g., a transparent or translucent display) that is configured to overlay or provide imagery over real-world imagery. In other embodiments, the display is a display screen that is configured to provide virtual reality imagery. The processing circuitry and the display may be configured to perform fixed foveated rendering or gaze tracked foveated rendering (e.g., adaptive foveated rendering) and define multiple tiles. The tiles about an edge or outer periphery of the display (e.g., in the user's peripheral vision) may be rendered at a lower quality and up-scaled, while the tiles that are in a fovea region or near or at a center of the display (e.g., in the user's line of sight) may be rendered at a higher quality. In some embodiments, the foveated rendering is non-fixed and uses eye tracking data obtained from eye-tracking sensors. For example, the processing circuitry may be configured to update, adjust, etc., the tiles for the foveated rendering so that high quality imagery is always provided at the user's gaze direction.

The processing circuitry is configured to perform a temporal anti-aliasing technique to reduce flickering or temporal artifacts that can occur due to aliasing or the foveated rendering. The processing circuitry may include a render engine that is configured to generate or provide image data. The processing circuitry may be configured to generate multiple tiles for the foveated rendering and may include an image renderer. The image renderer receives the head tracking data and identifies changes in the orientation and/or position of the user's head based on the head tracking data. In some embodiments, the image renderer receives a current frame and a previous frame as the image data (e.g., from a render engine, a game engine, etc.).

The image renderer can use the head tracking data or the changes in the orientation of the user's head to identify corresponding pixels between the previous frame and the current frame. Other anti-aliasing techniques analyze the image data (e.g., analyze the previous and the current frame or subsequent frames) and calculate motion vectors in order to identify corresponding pixels between the subsequent frames. However, this can be computationally expensive and may require additional computing time, thereby hindering processing time and display time of the head mounted or head wearable display system. The temporal anti-aliasing technique uses the real-world sensor data to determine pixel correspondence between subsequent frames.

The image renderer may blend the corresponding pixels between the subsequent frames using a blend weight parameter. In some embodiments, the blend weight parameter is a blend weight of the current frame. The image renderer may use bilinear sampling to retrieve the corresponding pixel values and blend corresponding sets of pixels, superpixels, etc., between the previous frame and the current frame. In some embodiments, the image renderer generates a blended frame. The image renderer may also use rejection logic that is based on color only (as opposed to color and depth) to determine if one or more of the corresponding pixels, collections of pixels, superpixels, etc., should not be blended. In some embodiments, the rejection logic does not use depth or additional information of the subsequent frames and uses color clamping and/or color clipping.

The image renderer outputs the blended frame which can be provided to the user on the display with the fixed, gaze tracked, or adaptive foveated rendering (e.g., using the tiles). In some embodiments, the temporal anti-aliasing technique described herein may also blend or reduce artifacts between adjacent tiles that have different sizes or different image/render qualities. Advantageously, the temporal anti-aliasing techniques described herein provides a low-computational cost and simplified anti-aliasing technique that may reduce temporal artifacts at a submillisecond computational cost.

Virtual Reality or Augmented Reality System

Referring now to FIG. 1, a system 100 (e.g., a display system, a head mounted display system, a wearable display system, etc.) can include a plurality of sensors 104a . . . n, processing circuitry 116, and one or more displays 164. System 100 can be implemented using HMD system 200 described in greater detail below with reference to FIG. 2. System 100 can be implemented using the computing environment described with reference to FIG. 4. System 100 can incorporate features of and be used to implement features of virtual reality (VR) systems. At least some of processing circuitry 116 can be implemented using a graphics processing unit (GPU). The functions of processing circuitry 116 can be executed in a distributed manner using a plurality of processing units. System 1000 is an AR, VR or mixed AR/VR system in some embodiments.

Processing circuitry 116 may include one or more circuits, processors, and/or hardware components. Processing circuitry 116 may implement any logic, functions or instructions to perform any of the operations described herein. Processing circuitry 116 can include any type and form of executable instructions executable by any of the circuits, processors or hardware components. The executable instructions may be of any type including applications, programs, services, tasks, scripts, libraries processes and/or firmware. Any of eye tracker 118, error manager 120, tile generator 122, an image renderer 124 may be any combination or arrangement of circuitry and executable instructions to perform their respective functions and operations. At least some portions of processing circuitry 116 can be used to implement image processing executed by sensors 104.

Sensors 104a . . . n can be image capture devices or cameras, including video cameras. Sensors 104a . . . n may be cameras that generate images of relatively low quality (e.g., relatively low sharpness, resolution, or dynamic range), which can help reduce the size, weight, and power requirements of system 100. For example, sensors 104a . . . n can generate images having resolutions on the order of hundreds of pixels by hundreds of pixels. At the same time, the processes executed by system 100 as described herein can be used to generate display images for presentation to a user that have desired quality characteristics, including depth characteristics.

Sensors 104a . . . n (generally referred herein as sensors 104) can include any type of one or more cameras. The cameras can be visible light cameras (e.g., color or black and white), infrared cameras, or combinations thereof. Sensors 104a . . . n can each include one or more lenses 108a . . . j generally referred herein as lens 108). In some embodiments, sensor 104 can include a camera for each lens 108. In some embodiments, sensor 104 include a single camera with multiple lenses 108a . . . j. In some embodiments, sensor 104 can include multiple cameras, each with multiple lenses 108. The one or more cameras of sensor 104 can be selected or designed to be a predetermined resolution and/or have a predetermined field of view. In some embodiments, the one or more cameras are selected and/or designed to have a resolution and field of view for detecting and tracking objects, such as in the field of view of a HMD for augmented reality. The one or more cameras may be used for multiple purposes, such as tracking objects in a scene or an environment captured by the image capture devices and performing calibration techniques described herein.

The one or more cameras of sensor 104 and lens 108 may be mounted, integrated, incorporated or arranged on an HMD to correspond to a left-eye view of a user or wearer of the HMD and a right-eye view of the user or wearer. For example, an HMD may include a first camera with a first lens mounted forward-facing on the left side of the HMD corresponding to or near the left eye of the wearer and a second camera with a second lens mounted forward-facing on the right-side of the HMD corresponding to or near the right eye of the wearer. The left camera and right camera may form a front-facing pair of cameras providing for stereographic image capturing. In some embodiments, the HMD may have one or more additional cameras, such as a third camera between the first and second cameras an offers towards the top of the HMD and forming a triangular shape between the first, second and third cameras. This third camera may be used for triangulation techniques in performing the depth buffer generations techniques of the present solution, as well as for object tracking.

System 100 can include a first sensor (e.g., image capture device) 104a that includes a first lens 108a, first sensor 104a arranged to capture a first image 112a of a first view, and a second sensor 104b that includes a second lens 108b, second sensor 104b arranged to capture a second image 112b of a second view. The first view and the second view may correspond to different perspectives, enabling depth information to be extracted from first image 112a and second image 112b. For example, the first view may correspond to a left eye view, and the second view may correspond to a right eye view. System 100 can include a third sensor 104c that includes a third lens 108c, third sensor 104c arranged to capture a third image 112c of a third view. As described with reference to FIG. 2, the third view may correspond to a top view that is spaced from an axis between first lens 108a and second lens 108b, which can enable system 100 to more effectively handle depth information that may be difficult to address with first sensor 104a and second sensor 104b, such as edges (e.g., an edge of a table) that are substantially parallel to the axis between first lens 108a and second lens 108b.

Light of an image to be captured by sensors 104a . . . n can be received through the one or more lenses 108a . . . j. Sensors 104a . . . n can include sensor circuitry, including but not limited to charge-coupled device (CCD) or complementary metal-oxide-semiconductor (CMOS) circuitry, which can detect the light received via the one or more lenses 108a . . . j and generate images 112a . . . k based on the received light. For example, sensors 104a . . . n can use the sensor circuitry to generate first image 112a corresponding to the first view and second image 112b corresponding to the second view. The one or more sensors 104a . . . n can provide images 112a . . . k to processing circuitry 116. The one or more sensors 104a . . . n can provide images 112a . . . k with a corresponding timestamp, which can facilitate synchronization of images 112a . . . k when image processing is executed on images 112a . . . k, such as to identify particular first and second images 112a, 112b representing first and second views and having the same timestamp that should be compared to one another to calculate gaze information.

Figure 2:
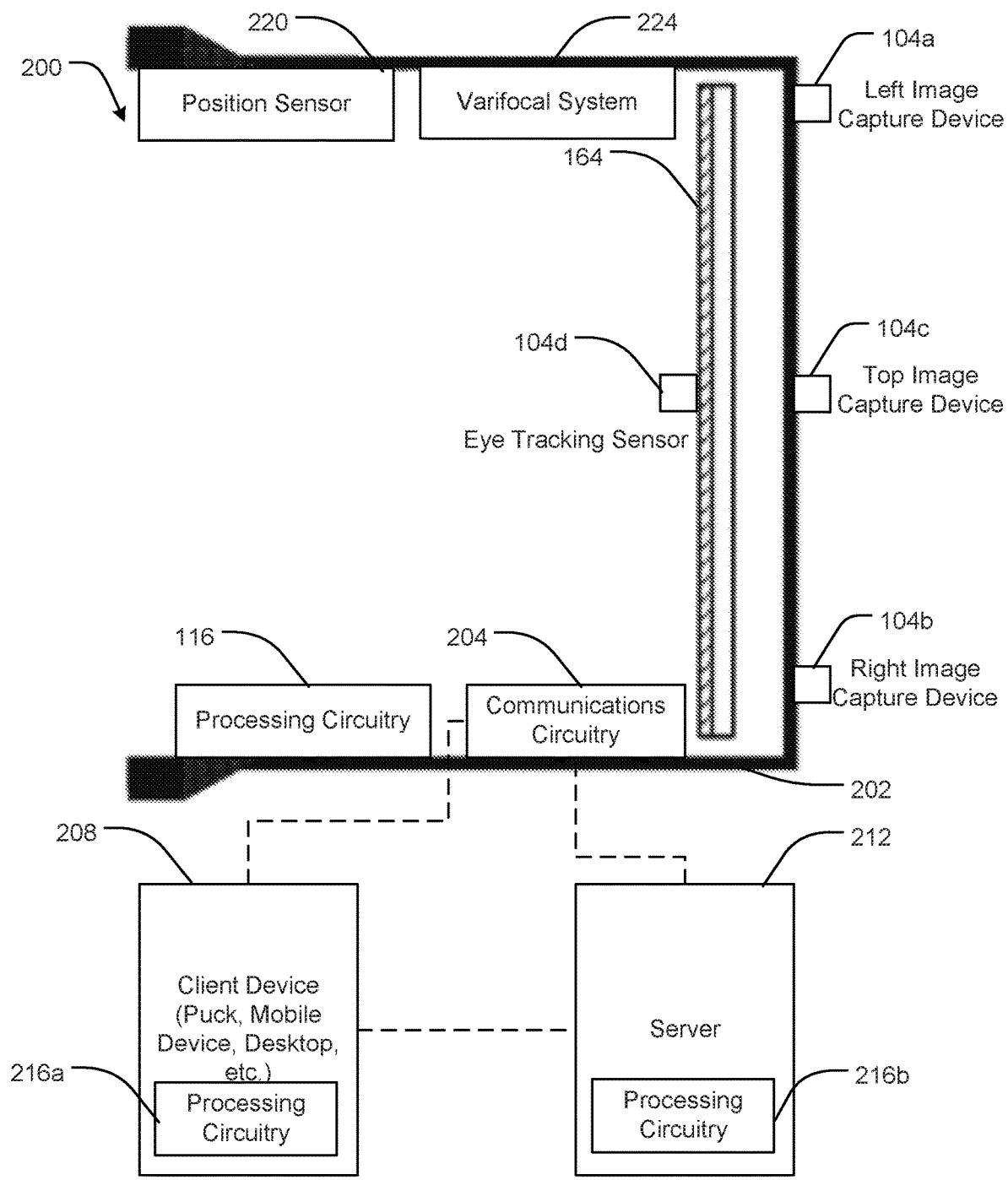
FIG. 2 is a schematic diagram of a head-mounted display (HMD) system, according to some embodiments.

Sensors 104 can include eye tracking sensors 104 or head tracking sensors 104 that can provide information such as positions, orientations, or gaze directions of the eyes or head of the user (e.g., wearer) of an HMD. In some embodiments, sensors 104 are inside out tracking cameras configured to provide images for head tracking operations. Sensors 104 can be eye tracking sensors 104 that provide eye tracking data 148, such as data corresponding to at least one of a position or an orientation of one or both eyes of the user. Sensors 104 can be oriented in a direction towards the eyes of the user (e.g., as compared to sensors 104 that capture images of an environment outside of the HMD). For example, sensors 104 can include at least one fourth sensor 104d (e.g., as illustrated in FIG. 2) which can be oriented towards the eyes of the user to detect sensor data regarding the eyes of the user.

In some embodiments, sensors 104 output images of the eyes of the user, which can be processed to detect an eye position or gaze direction (e.g., first gaze direction) of the eyes. In some embodiments, sensors 104 process image data regarding the eyes of the user, and output the eye position or gaze direction based on the image data. In some embodiments, sensors 104 optically measure eye motion, such as by emitting light (e.g., infrared light) towards the eyes and detecting reflections of the emitted light.

As discussed further herein, an eye tracking operation can include any function, operation, routine, logic, or instructions executed by system 100 or components thereof to track data regarding eyes of the user, such as positions or orientations (e.g., gaze directions) of the eyes of the user as the eyes of the user move during use of the HMD. For example, the eye tracking operation can be performed using at least one of one or more sensors 104 or eye tracker 118. For example, the eye tracking operation can process eye tracking data 148 from sensor 104 to determine an eye position, gaze direction, gaze vector, focal point, point of view, etc., shown as gaze vector 136 of eye(s) of the user. In some embodiments, the eye tracking operation can be performed using eye tracker 118 that is implemented using a portion of processing circuitry 116 that is coupled with, mounted to, integral with, implemented using a same circuit board as, or otherwise provided with one or more sensors 104 that detect sensor data regarding the eyes of the user. In some embodiments, the eye tracking operation can be performed using an eye tracker 118 that receives sensor data by a wired or wireless connection from the one or more sensors 104 that are configured to detect sensor data regarding the eyes of the user (e.g., images of the eyes of the user); for example, eye tracker 118 can be implemented using the same processing hardware as at least one of error manager 120, tile generator 122, and/or image renderer 124. Various such combinations of sensor hardware of sensors 104 and/or processing hardware of processing circuitry 116 may be used to implement the eye tracking operation.

Eye tracker 118 can generate gaze vector 136 in various manners. For example, eye tracker 118 can process eye tracking data 148 to identify one or more pixels representing at least one of a position or an orientation of one or more eyes of the user. Eye tracker 118 can identify, using eye tracking data 148, gaze vector 136 based on pixels corresponding to light (e.g., light from light sources/light emitting diodes/actuators of sensors 104, such as infrared or near-infrared light from actuators of sensors 104, such as 850 nm light eye tracking) reflected by the one or more eyes of the user. Eye tracker 118 can use light from various illumination sources or reflections in the HMD or AR system, such as from waveguides, combiners, or lens cameras. Eye tracker 118 can determine gaze vector 136 or eye position by determining a vector between a pupil center of one or more eyes of the user and a corresponding reflection (e.g., corneal reflection). Gaze vector 136 can include position data such as at least one of a position or an orientation of each of one or more eyes of the user. The position data can be in three-dimensional space, such as three-dimensional coordinates in a Cartesian, spherical, or other coordinate system. Gaze vector 136 can include position data including a gaze direction of one or more eyes of the user. In some embodiments, eye tracker 118 includes a machine learning model. The machine learning model can be used to generate eye position or gaze vector 136 based on eye tracking data 148.

Processing circuitry 116 can include an error manager 120. Error manager 120 is configured to receive eye tracking data 148 from sensor(s) 104 and determine gaze error 126 associated with gaze vector 136. Gaze error 126 can include error for eye position, gaze direction, eye direction, etc., of gaze vector 136 (e.g., gaze location, gaze vector 302, etc.). Error manager 120 can receive eye tracking data 148 from sensor(s) 104 and perform an error analysis to determine gaze error 126. Error manager 120 monitors eye tracking data 148 over time and/or gaze vector 136 over time and determines gaze error 126 based on eye tracking data 148 and/or gaze vector 136, according to some embodiments. In some embodiments, error manager 120 provides gaze error 126 to tile generator 122. Eye tracker 118 also provides gaze vector 136 to tile generator 122, according to some embodiments. Error manager 120 can be configured to identify, determine, calculate, etc., any of rotational velocity, prediction error, fixation error, a confidence interval of gaze vector 136, random error, measurement error of gaze vector 136, etc.

Processing circuitry 116 includes tile generator 122, according to some embodiments. Tile generator 122 is configured to receive gaze vector 136 from eye tracker 118 and gaze error 126 from error manager 120, according to some embodiments. Tile generator 122 is configured to define one or more tiles 128 (e.g., tiles 602 shown in FIGS. 6-15 and 21), superpixels, collection of pixels, render areas, resolution areas, etc., for image renderer 124, according to some embodiments. Tile generator 122 generates tiles 128 based on gaze vector 136, a focal gaze location of the user's eyes, a reference gaze location, a direction of gaze, eye position, a point of interest, etc., according to some embodiments. Tile generator 122 generates various subsets of tiles 128 for displaying imagery on display(s) 164 and corresponding resolutions, according to some embodiments. In some embodiments, tile generator 122 defines a first set of tiles 128 that should have a high resolution (e.g., a high level of detail, high image quality, etc.), a second set of tiles 128 that should have a medium resolution, and a third set of tiles that should have a low resolution. Tiles 128 include a corresponding size (e.g., height and width, number of pixels, gaze angles, etc.) for each tile 128, according to some embodiments.

In some embodiments, tiles 128 include data regarding a corresponding position on display(s) 164 or a display buffer of display(s) 164. For example, tile generator 122 generates multiple tiles 128 that collectively cover an entirety of display(s) 164 or the display buffer of display(s) 164 and associated positions within display(s) 164, according to some embodiments. Tile generator 122 provides tiles 128 to image renderer 124 for use in generating a rendered image 130, a display buffer, a display image, a render buffer, etc., according to some embodiments. Tile generator 122 also generates or defines tiles 128 based on gaze error 126, according to some embodiments. In some embodiments, tile generator 122 divides a total area of display(s) 164 into various subsections, collection of pixels, etc., referred to as tiles 128. Tile generator 122 assigns a corresponding resolution to each of tiles 128, according to some embodiments. In some embodiments, tile generator 122 redefines tiles 128 periodically or dynamically based on updated or new gaze error 126 and/or gaze vector 136. In some embodiments, tile generator 122 defines a size, shape, position, and corresponding resolution of imagery for each of tiles 128. In some embodiments, any of the size, position, and corresponding resolution of imagery for each of tiles 128 is determined by tile generator 122 based on gaze vector 136 and/or gaze error 126.

Processing circuitry 116 includes image renderer 124, according to some embodiments. In some embodiments, image renderer 124 is configured to receive tiles 128 from tile generator 122 and use tiles 128 to generate an image, a render buffer, a display image, a display buffer, etc., for display(s) 164. In some embodiments, image renderer 124 receives image data 132 and uses tiles 128 to display the image data on display(s) 164. In some embodiments, image renderer 124 receives tiles 128 and image data 132 and generates a rendered image 130 based on tiles 128 and image data 132. Image renderer 124 uses the size, shape, position, and corresponding resolution of each of tiles 128 to rasterize image data 132 to generate rendered image 130, according to some embodiments.

Image renderer 124 is a 3D image renderer or 2D image renderer, according to some embodiments. Image renderer 124 uses image related input data to process, generate and render display or presentation images to display or present on one or more display devices, such as via an HMD, according to some embodiments. Image renderer 124 generates or creates 2D images of a scene or view for display on display 164 and representing the scene or view in a 3D manner, according to some embodiments. The display or presentation data (e.g., image data 132) to be rendered includes geometric models of 3D objects in the scene or view, according to some embodiments. Image renderer 124 determines, computes, or calculates the pixel values of the display or image data to be rendered to provide the desired or predetermined 3D image(s), such as 3D display data for images 112 captured by the sensor 104, according to some embodiments. Image renderer 124 receives images 112, tiles 128, and head tracking data 150 and generates display images using images 112.

Image renderer 124 can render frames of display data to one or more displays 164 based on temporal and/or spatial parameters. Image renderer 124 can render frames of image data sequentially in time, such as corresponding to times at which images are captured by the sensors 104. Image renderer 124 can render frames of display data based on changes in position and/or orientation to sensors 104, such as the position and orientation of the HMD. Image renderer 124 can render frames of display data based on left-eye view(s) and right-eye view(s) such as displaying a left-eye view followed by a right-eye view or vice-versa.

Image renderer 124 can generate the display images using motion data regarding movement of the sensors 104a . . . n that captured images 112a . . . k. For example, the sensors 104a . . . n may change in at least one of position or orientation due to movement of a head of the user wearing an HMD that includes the sensors 104a . . . n (e.g., as described with reference to HMD system 200 of FIG. 2). Processing circuitry 116 can receive the motion data from a position sensor (e.g., position sensor 220 described with reference to FIG. 2). Image renderer 124 can use the motion data to calculate a change in at least one of position or orientation between a first point in time at which images 112a . . . k were captured and a second point in time at which the display images will be displayed, and generate the display images using the calculated change. Image renderer 124 can use the motion data to interpolate and/or extrapolate the display images relative to images 112a . . . k. Although image renderer 124 is shown as part of processing circuitry 116, the image renderer may be formed as part of other processing circuitry of a separate device or component, such as the display device, for example within the HMD.

System 100 can include one or more displays 164. The one or more displays 164 can be any type and form of electronic visual display. The displays may have or be selected with a predetermined resolution and refresh rate and size. The one or more displays can be of any type of technology such as LCD, LED, ELED or OLED based displays. The form factor of the one or more displays may be such to fit within the HMD as glasses or goggles in which the display(s) are the lens within the frame of the glasses or goggles. Displays 164 may have a refresh rate the same or different than a rate of refresh or frame rate of processing circuitry 116 or image renderer 124 or the sensors 104.

Referring now to FIG. 2, in some implementations, an HMD system 200 can be used to implement system 100. HMD system 200 can include an HMD body 202, a left sensor 104a (e.g., left image capture device), a right sensor 104b (e.g., right image capture device), and display 164. HMD body 202 can have various form factors, such as glasses or a headset. The sensors 104a, 104b can be mounted to or integrated in HMD body 202. The left sensor 104a can capture first images corresponding to a first view (e.g., left eye view), and the right sensor 104b can capture images corresponding to a second view (e.g., right eye view).

HMD system 200 can include a top sensor 104c (e.g., top image capture device). Top sensor 104c can capture images corresponding to a third view different than the first view or the second view. For example, top sensor 104c can be positioned between the left sensor 104a and right sensor 104b and above a baseline between the left sensor 104a and right sensor 104b. This can enable top sensor 104c to capture images with depth information that may not be readily available to be extracted from the images captured by left and right sensors 104a, 104b. For example, it may be difficult for depth information to be effectively extracted from images captured by left and right sensors 104a, 104b in which edges (e.g., an edge of a table) are parallel to a baseline between left and right sensors 104a, 104b. Top sensor 104c, being spaced from the baseline, can capture the third image to have a different perspective, and thus enable different depth information to be extracted from the third image, than left and right sensors 104a, 104b.

HMD system 200 can include processing circuitry 116, which can perform at least some of the functions described with reference to FIG. 1, including receiving sensor data from sensors 104a, 104b, and 104c as well as eye tracking sensors 104, and processing the received images to calibrate an eye tracking operation.

HMD system 200 can include communications circuitry 204. Communications circuitry 204 can be used to transmit electronic communication signals to and receive electronic communication signals from at least one of a client device 208 or a server 212. Communications circuitry 204 can include wired or wireless interfaces (e.g., jacks, antennas, transmitters, receivers, transceivers, wire terminals) for conducting data communications with various systems, devices, or networks. For example, communications circuitry 204 can include an Ethernet card and port for sending and receiving data via an Ethernet-based communications network. Communications circuitry 204 can communicate via local area networks (e.g., a building LAN), wide area networks (e.g., the Internet, a cellular network), and/or conduct direct communications (e.g., NFC, Bluetooth). Communications circuitry 204 can conduct wired and/or wireless communications. For example, communications circuitry 204 can include one or more wireless transceivers (e.g., a Wi-Fi transceiver, a Bluetooth transceiver, a NFC transceiver, a cellular transceiver). For example, communications circuitry 204 can establish wired or wireless connections with the at least one of the client device 208 or server 212. Communications circuitry 204 can establish a USB connection with the client device 208.

HMD system 200 can be deployed using different architectures. In some embodiments, the HMD (e.g., HMD body 202 and components attached to HMD body 202) comprises processing circuitry 116 and is self-contained portable unit. In some embodiments, the HMD has portions of processing circuitry 116 that work in cooperation with or in conjunction with any type of portable or mobile computing device or companion device that has the processing circuitry or portions thereof, such as in the form of a staging device, a mobile phone or wearable computing device. In some embodiments, the HMD has portions of processing circuitry 116 that work in cooperation with or in conjunction with processing circuitry, or portions thereof, of a desktop computing device. In some embodiments, the HMD has portions of processing circuitry 116 that works in cooperation with or in conjunction with processing circuitry, or portions thereof, of a server computing device, which may be deployed remotely in a data center or cloud computing environment. In any of the above embodiments, the HMD or any computing device working in conjunction with the HMD may communicate with one or more servers in performing any of the functionality and operations described herein.

The client device 208 can be any type and form of general purpose or special purpose computing device in any form factor, such as a mobile or portable device (phone, tablet, laptop, etc.), or a desktop or personal computing (PC) device. In some embodiments, the client device can be a special purpose device, such as in the form of a staging device, which may have the processing circuitry or portions thereof. The special purpose device may be designed to be carried by the user while wearing the HMD, such as by attaching the client device 208 to clothing or the body via any type and form of accessory attachment. The client device 208 may be used to perform any portion of the image and rendering processing pipeline described in connection with FIGS. 1 and 3. The HMD may perform some or other portions of the image and rendering processing pipeline such as image capture and rendering to display 164. The HMD can transmit and receive data with the client device 208 to leverage the client device 208's computing power and resources which may have higher specifications than those of the HMD.

Server 212 can be any type of form of computing device that provides applications, functionality or services to one or more client devices 208 or other devices acting as clients. In some embodiments, server 212 can be a client device 208. Server 212 can be deployed in a data center or cloud computing environment accessible via one or more networks. The HMD and/or client device 208 can use and leverage the computing power and resources of server 212. The HMD and/or client device 208 can implement any portion of the image and rendering processing pipeline described in connection with FIGS. 1 and 3. Server 212 can implement any portion of the image and rendering processing pipeline described in connection with FIGS. 1 and 3, and in some cases, any portions of the image and rendering processing pipeline not performed by client device 208 or HMD. Server 212 may be used to update the HMD and/or client device 208 with any updated to the applications, software, executable instructions and/or data on the HMD and/or client device 208.

System 200 can include a position sensor 220. The position sensor 220 can output at least one of a position or an orientation of the body 202. As the image capture devices 104a, 104b, 104c can be fixed to the body 202 (e.g., at predetermined locations relative to the position sensor 220), the position sensor 220 can output at least one of a position or an orientation of each sensor 104a, 104b, 104c. The position sensor 220 can include at least one of an inertial measurement unit (IMU), an accelerometer, a gyroscope, or a magnetometer (e.g., magnetic compass).

System 200 can include a varifocal system 224. Varifocal system 224 can have a variable focal length, such that varifocal system 224 can change a focus (e.g., a point or plane of focus) as focal length or magnification changes. Varifocal system 224 can include at least one of a mechanical lens, liquid lens, or polarization beam plate. In some embodiments, varifocal system 224 can be calibrated by processing circuitry 116 (e.g., by a calibrator), such as by receiving an indication of a vergence plane from a calibrator which can be used to change the focus of varifocal system 224. In some embodiments, varifocal system 224 can enable a depth blur of one or more objects in the scene by adjusting the focus based on information received from the calibrator so that the focus is at a different depth than the one or more objects.

In some embodiments, display 164 includes one or more waveguides. The waveguides can receive (e.g., in-couple) light corresponding to display images to be displayed by display 164 from one or more projectors, and output (e.g., out-couple) the display images, such as for viewing by a user of the HMD. The waveguides can perform horizontal or vertical expansion of the received light to output the display images at an appropriate scale. The waveguides can include one or more lenses, diffraction gratings, polarized surfaces, reflective surfaces, or combinations thereof to provide the display images based on the received light. The projectors can include any of a variety of projection devices, such as LCD, LED, OLED, DMD, or LCOS devices, among others, to generate the light to be provided to the one or more waveguides. The projectors can receive the display images from processing circuitry 116 (e.g., from image renderer 124). The one or more waveguides can be provided through a display surface (e.g., glass), which can be at least partially transparent to operate as a combiner (e.g., combining light from a real world environment around the HMD with the light of the outputted display images).

Display 164 can perform foveated rendering (e.g., fixed foveated rendering, adaptive foveated rendering, gaze tracked foveated rendering) based on the calibrated eye tracking operation, which can indicate a gaze point corresponding to the gaze direction generated by the eye tracking operation. For example, processing circuitry 116 can identify at least one of a central region of the FOV of display 164 (e.g., a plurality of pixels within a threshold distance from the gaze point) peripheral region of the FOV of display 164 based on the gaze point (e.g., a peripheral region represented by a plurality of pixels of the display images that are within a threshold distance of an edge of the display images or more than a threshold distance from the gaze point). Processing circuitry 116 can generate the display images to have a less quality (e.g., resolution, pixel density, frame rate) in the peripheral region than in the central region, which can reduce processing demand associated with operation of HMD system 200.

In some embodiments, processing circuitry 116 is configured to perform a temporal anti-aliasing technique to reduce temporal artifacts (e.g., flickering) that may occur as a result of foveated rendering. The temporal anti-aliasing technique as described herein may also advantageously reduce artifacts between adjacent tiles.

Temporal Anti-Aliasing
Image Renderer

Figure 4:
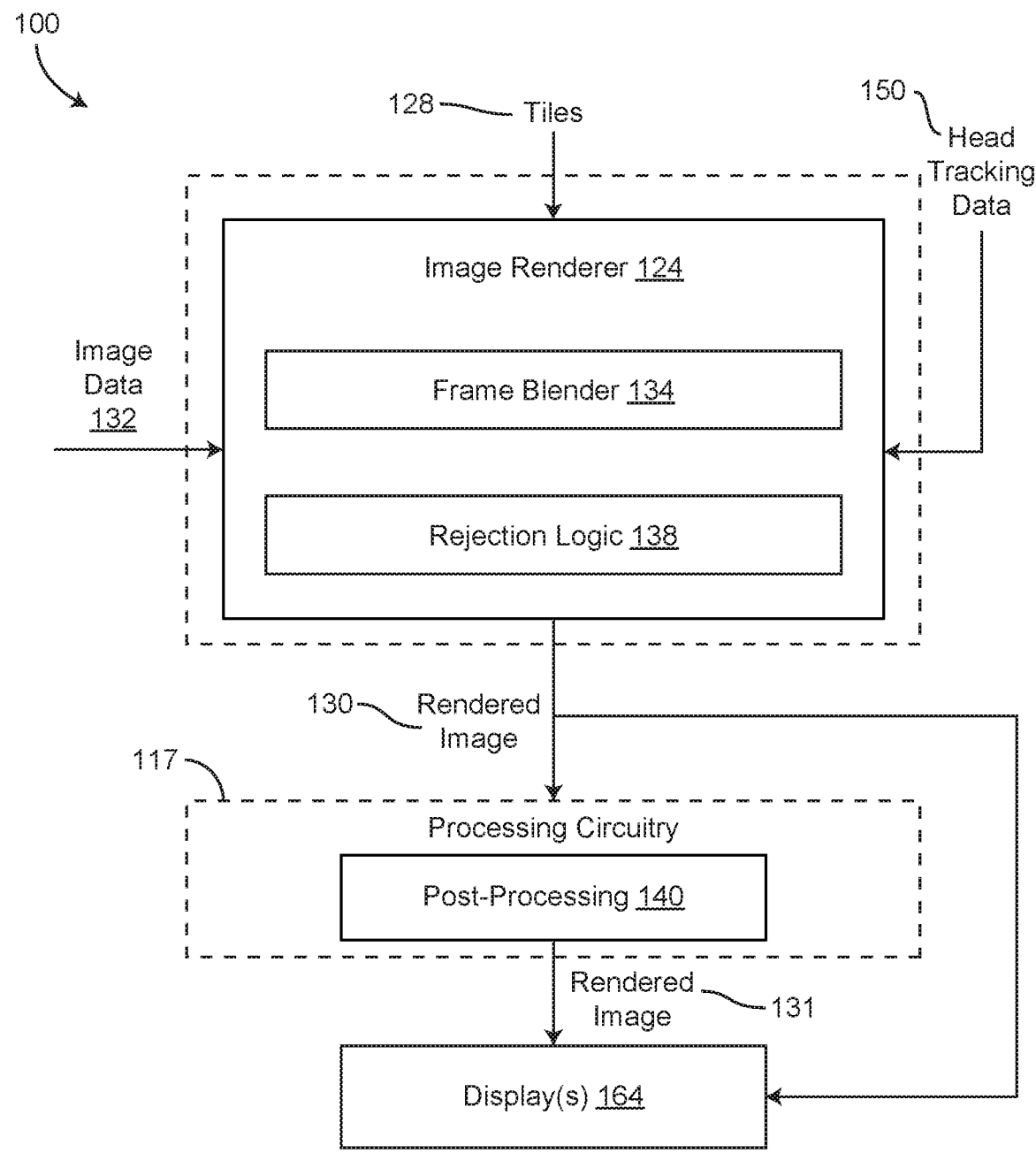
FIG. 4 is a block diagram of an image renderer of the display system of FIG. 1 configured to perform temporal anti-aliasing, according to some embodiments.

Referring to FIGS. 1 and 4, a portion of system 100 is shown in greater detail, according to some embodiments. In some embodiments, image renderer 124 is configured to perform temporal anti-aliasing to generate rendered image 130. The temporal anti-aliasing may be performed completely by image renderer 124 on processing circuitry 116 or may at least partially be performed across multiple controllers, processing units, processing devices, processors, etc., that are in communicable connection. For example, processing circuitry 117 can be configured to perform post-processing (e.g., sharpening) to further enhance rendered image 130 before providing a rendered image 131 to display(s) 164.

In some embodiments, tile generator 122 and image renderer 124 are configured to perform foveated rendering (e.g., fixed foveated rendering (FFR), adaptive foveated rendering, gaze tracked foveated rendering, etc.). When performing foveated rendering, tile generator 122 and image renderer 124 may display, render, generate, etc., imagery in a user's periphery at a lower shading rate (while areas at the center are rendered using a higher shading rate or higher image resolution) and/or downsampled and upscaled, which may result in aliasing artifacts around the user's periphery. When system 100 is a head mounted or head wearable system (e.g., system 200), movement of the user's head may result in the aliasing artifacts flickering. In some embodiments, even the higher resolution area at the center of the user's view may flicker due to aliasing and head motion.

Some anti-aliasing systems compare previous and current frames and blend the frames to reduce aliasing artifacts. For example, these systems may use image analysis and/or motion vectors to automatically detect motion and direction of motion between the frames. These systems may then determine, using the motion vectors, which pixels of the previous and current frame correspond to each other and can blend the corresponding pixels. When the frames remain substantially the same (e.g., the previous frame and the current frame are substantially the same image), these systems may introduce artificial viewport jittering between frames at the pixel or sub-pixel level. Additionally, these anti-aliasing techniques can use strong rejection logic (e.g., using both color and depth) to determine if one or more of the pixels should not be blended across the previous and current frames. Finally, these anti-aliasing techniques may also include pre or post-processing (e.g., sharpening) to reduce blur that can occur from blending previous and current frames.

However, such anti-aliasing techniques may be computationally inefficient, and/or require a large amount of computing resources. This is undesirable in the case of a mobile display system, since the processing unit that performs the rendering and anti-aliasing techniques is often constrained in size and power. For example, if system 100 is a head mounted or head wearable system, the size of processing circuitry 116 may be limited and processing capabilities of processing circuitry 116 may be limited. Accordingly, it is desirable and advantageous, particularly for mobile display systems such as head wearable or head mounted displays, to perform anti-aliasing that accounts for aliasing artifacts and/or flickering with reduced processing requirements.

Referring particularly to FIG. 4, image renderer 124 may be implemented on processing circuitry 116 and can be configured to receive tiles 128 from tile generator 122. In some embodiments, tiles 128 are generated by tile generator 122 for foveated rendering. For example, tiles 128 can be the same size and position, regardless of a user's eye. In some embodiments, a size of tiles 128 for FFR is at least partially based on a position on display 164. For examples, tiles 128 that are in the user's periphery may be larger or be associated with a lower resolution, image quality, etc., while tiles that are in the center of display 164 can have a smaller size, higher image quality, higher shading, etc. Frame blender 134 and rejection logic 138 are configured to perform a temporal anti-aliasing technique as described herein to reduce flickering associated with foveated rendering and/or to reduce artifacts that may result from foveated rendering. In some embodiments, processing circuitry 116 and processing circuitry 117 perform the temporal anti-aliasing technique.

Image renderer 124 can include a frame blender 134 and rejection logic 138, according to some embodiments. In some embodiments, frame blender 134 is configured to determine which of one or more pixels of a current frame and a previous frame of image data 132 should be blended. Frame blender 134 can receive head tracking data 150 from any of sensors 104$a$ . . . $n$. In some embodiments, the head tracking data 150 is received from an inertial measurement unit, a gyroscope, etc., or any other sensor on a head mounted display, a head wearable display, a virtual reality headset, an augmented reality headset, a mixed reality headset, etc. The head tracking data 150 can indicate a current orientation and/or position of the user's head (e.g., in Cartesian coordinates, spherical coordinates, cylindrical coordinates, etc., or any other coordinate system). In some embodiments, the frame blender 134 receives the head tracking data 150 in real-time and tracks changes in the orientation and/or position of the user's head.

Frame blender 134 can receive a previous frame and a current frame (e.g., a previous image, previous image data, a current image, current image data, etc.) from a render engine, etc., of processing circuitry 116. In some embodiments, frame blender 134 uses changes in the orientation and/or position of the user's head to determine a correspondence between pixels of the previous frame and pixels of the current frame. For example, if a user changes their head orientation an angular amount $\Delta\theta$ about an axis, frame blender 134 may receive a first angular value $\theta_1$ and a second angular value $\theta_2$ and determine the angular change $\Delta\theta$ between $\theta_1$ and $\theta_2$. In some embodiments, frame blender 134 uses changes in the head orientation about one or more axes to identify a correspondence between one or more pixels of the previous frame and one or more pixels of the current frame.

For example, for an arbitrary pixel $p_i$ of the previous frame, frame blender 134 can use the angular changes $\Delta\theta$ to identify the same pixel $p_n$ in the current frame. In some embodiments, frame blender 134 uses the angular changes $\Delta\theta$ of the user's head (e.g., the head tracking data 150) to identify correspondence between all of the pixels of the previous frame and the pixels of the current frame. In some embodiments, frame blender 134 uses a measurement of the orientation and/or position of the user's head at a first time $t_1$ corresponding to or associated the current frame and a previous time $t_2$ corresponding to or associated with the previous frame. In this way, the head motion between the previous time and the current time may indicate a change of the orientation of the user's head between the previous frame and the current frame, and this change may be used to determine or identify pixel correspondence across the previous frame and the current frame for the anti-aliasing technique.

Other anti-aliasing systems calculate and use motion vectors to determine pixel correspondence between the frames. For example, some systems include a render engine that analyzes pixels, image data, super-pixels, collections of pixels, etc., of the previous frame and the current frame to identify pixel correspondence. These systems may calculate motion vectors based on subpixel shifts or motion detected between the previous and current frame. Advantageously, the systems and methods described herein use the head tracking data 150 and/or changes in the orientation of the user's head (e.g., as measured by an inertial measurement unit) to determine pixel correspondence between the previous and the current frame, thereby reducing the need to analyze the previous and current frame and calculate motion vectors. Rather, changes in the orientation of the user's head are used to directly determine pixel correspondence between the previous frame and the current frame. This completely removes the need to calculate motion vectors and reduces processing requirements.

In some embodiments, frame blender 134 blends, blurs, merges, interpolates, etc., the previous frame and the current frame to generate a blended frame for the rendered image 130. In some embodiments, frame blender 134 blends, merges, interpolates, etc., the corresponding pixels between the previous frame and the current frame to generate the blended frame. Frame blender 134 may use a weight w that is associated with the previous frame to blend the corresponding pixels of the previous frame and the current frame. In some embodiments, the weight w is a normalized value (e.g., between 0 and 1, where 1 indicates that the previous frame is not used for blending). The weight w may indicate a blend weight or a sampling weight of the previous or current frame that is used to generate the blended frame. In some embodiments, the frame blender 134 uses a blend weight w of 0.2. In other embodiments, the frame blender 134 uses a blend weight w of 0.04. The blend weight w may depend on system parameters, system architecture, display resolution, etc. In some embodiments, the blend weight w is adjustable or adaptable. For example the blend weight w may be related to, proportional to, directly related to, etc., a distance between a sampling point and a pixel center of the bilinear filtering or bilinear sampling techniques performed by frame blender 134 as described in greater detail below.

In some embodiments, frame blender 134 uses a bilinear filtering or a bilinear sampling technique to generate the blended frame. For example, frame blender 134 may use bilinear interpolation to blend or shade between texels of the previous frame, the current frame, or the blended frame. In some embodiments, frame blender 134 uses a sampling point for the bilinear interpolation or sampling that is proximate a pixel center. In some embodiments, adjusting the sampling point of the bilinear interpolation or sampling closer, proximate to, or at the pixel center and adjusting the blend weight w of the previous or current frame can cooperatively adjust flicker reduction and blur amount. For example, if the blend weight w is set too low, the flicker may be substantially reduced, but the blended image/frame may be blurry. Likewise, if the blend weight w is set too high, the blended image/frame may be sufficiently sharp but flickering and/or aliasing artifacts may occur. Accordingly, by adjusting both the sampling point of the bilinear filtering/sampling closer to, at, or proximate the pixel center, and adjusting the blend weight w, a desired amount of flicker reduction and sufficient image sharpness can be achieved. In some preferred embodiments, the blend weight w is 0.2 and the sampling point of the bilinear sampling is proximate the pixel center. In some embodiments, the blend weight w is any value from 0.1 to 0.3. In other embodiments, the blend weight w is greater than 0.2. In some embodiments, the blend weight w is less than 0.1.

In some embodiments, when the user's head is substantially or generally stationary (e.g., when the user is looking at a particular object, scene, character, image, etc., for some amount of time), sensor noise or slight movements in the user's head may be transferred to the frame blender 134 through the head tracking data 150. For example, the head tracking data 150 may include some natural amount of jitter, noise, changes, etc., over time due to sensor noise or slight head motion. The natural jitter or noise in the head tracking data 150 may reduce the need to provide viewport jittering as other anti-aliasing techniques do. For example, other anti-aliasing techniques generate artificial jitter between subsequent frames so that the pixels are spatially jittered slight amounts between subsequent frames so that the subsequent frames are not identical.

Image renderer 124 may use the natural jitter associated with head tracking data 150 instead of artificially producing viewport jitter. For example, since the system is a head mounted or head wearable system, the natural shift in the user's head position and/or head orientation may reduce the need for image renderer 124 to artificially jitter (e.g., spatially) the pixels across subsequent frames of the image data 132. In some embodiments, image renderer 124 uses the natural jitter associated with the head tracking data 150 (e.g., due to sensor variability and/or slight head motion) instead of artificial viewport jitter. Advantageously, using the natural head motion as indicated by head tracking data 150 instead of artificial jitter reduces computational requirements associated with generating and applying the artificial viewport jitter.

Referring still to FIG. 4, image renderer 124 also includes rejection logic 138. In some embodiments, frame blender 134 is configured to blend one or more corresponding pixels between the previous and current frame subject to rejection logic 138. For example, rejection logic 138 can determine that one or more of the corresponding pixels should not be blended between the previous and the current frame due to a moving object.

In some embodiments, rejection logic 138 is based on color of the pixels, subpixels, super pixels, collections of pixels, etc., without accounting for depth. For example, rejection logic 138 may use only red, green, and blue (RGB) information to determine if any of the corresponding pixels should not be blended. In some embodiments, rejection logic 138 uses only color information of the previous frame and/or the current frame to determine if any (e.g., one or more) of the corresponding pixels should not be blended or merged. Rejection logic 138 can use an RGB color model, a YCoCg color model (e.g., luma, chrominance orange, and chrominance green), etc., or any other color model to determine if any of the corresponding pixels between the previous frame and the current frame should not be blended. In some embodiments, image renderer 124 uses color-data only rejection logic 138 for portions of the previous frame and/or the current frame that are in the user's peripheral view.

Other anti-aliasing techniques use complex rejection logic including color, depth, etc., to determine if one or more of the pixels should not be blended. However, such rejection logic may be computationally intensive and require additional processing power. Advantageously, the temporal anti-aliasing techniques described herein utilize reduced complexity or weaker rejection logic (e.g., using only RGB or only color data as opposed to color data and depth) which can reduce the computational requirements and/or size of processing circuitry 116. This can be particularly useful for head mounted, head wearable, etc., display systems where weight, size, and computational abilities are limited.

Referring still to FIG. 4, image renderer 124 can use color clamping and/or color clipping to generate rendered image 130. In some embodiments, rejection logic 138 uses a color clamping or a color clipping technique to determine which of the corresponding pixels across the previous and current (or subsequent) frames should not be blended. In some embodiments, using rejection logic 138 with an YCoCg color model is more accurate than using rejection logic 138 with an RGB color model. In some embodiments, using color clipping as opposed to color clamping has less hue shift ghosting artifacts between adjacent or nearby pixels, collections of pixels, superpixels, etc.

In some embodiments, image renderer 124 is performed on a mobile graphical processing unit (GPU). On modern mobile GPUs, tile-based rendering is used to reduce the bandwidth of accessing off-chip framebuffer memory. Performing a separate renderpass may be costly since it requires transmitting data between high-speed GPU local cache and an off-chip framebuffer memory/system memory.

In tile-based rendering, a single renderpass may be separated into three stages or steps including binning, rendering, and resolving. In some embodiments, the single renderpass is performed by image renderer 124. In some embodiments, binning includes determining one or more triangles to be rendered in each tile. In some embodiments, the rendering step includes rendering all the geometries to the tile local cache. In some embodiments, resolving includes transferring all color contents to framebuffer memory.

To facilitate optimal performance, image renderer 124 can be configured to use a subpass for the temporal anti-aliasing, according to some embodiments. In some embodiments, the subpass keeps all the color content within the tile local memory. More optimally, image renderer 124 may perform the subpass as a part of the resolving stage. On a mobile GPU, a resolving stage may be very similar to pixel shading. However, the resolving stage may directly write the output to system memory.

In some embodiments, image renderer 124 is also configured to perform texture sampling as a part of the resolving stage to sample pixel colors in the history buffer. A custom resolve shader can be used by image renderer 124 as a part of the resolving stage to perform temporal anti-aliasing. In some embodiments, image renderer 124 performs temporal anti-aliasing only in downsampled regions, before resolving to full resolution in system memory. Pixels in a full-resolution region may be unmodified when resolved into system memory by image renderer 124.

In some embodiments, the computational cost of image renderer 124 is reduced since there are significantly less pixels to be processed in the downsampled region(s). For an eye-tracked foveated render use case, the rejection logic 138 of image renderer 124 can be further optimized since the color artifact in the human peripheral vision is less perceptible. In some embodiments, image renderer 124 is configured to clamp color RBG values directly to an axis-aligned bounding box. In some embodiments, image renderer 124 or rejection logic 138 use:

$$\hat{c}_t = \max_{rgb}((\hat{c}_{t-1}, c_{max}), c_{min})$$

where $\hat{c}_t$ and $\hat{c}_{t-1}$ represent color pixel color and corresponding reconstructed previous frame pixel values respectively, and $c_{max}$ and $c_{min}$ represent a maximal and minimal RGB of neighboring pixels (including a current pixel).

Referring still to FIG. 4, processing circuitry 116 may be communicably coupled with an external device, a digital processing unit, a display unit, an external processor, etc., shown as processing circuitry 117. In some embodiments, processing circuitry 117 is positioned on the head mounted display device of system 100. In some embodiments, processing circuitry 117 is a post-processor.

Processing circuitry 117 includes post-processing 140 that is configured to receive the rendered image 130 from processing circuitry 116 (e.g., from image renderer 124) and output rendered image 131 (e.g., for display on display(s) 164). In some embodiments, processing circuitry 117 is optional. For example, the post-processing 140 may be configured to sharpen the rendered image 130 and provide a sharpened rendered image 131. In some embodiments, post-processing 140 is performed by processing circuitry 116. In some embodiments, the post-processing 140 sharpening is not performed since the regions affected most by the anti-aliasing technique are in the user's peripheral vision which may be hidden or less noticeable at the periphery of a lens of display(s) 164. In some embodiments, the sharpening post-processing 140 performed by processing circuitry 117 is optional. For example, either the rendered image 130 (e.g., the un-sharpened rendered image) or the rendered image 131 (e.g., the sharpened rendered image) may be provided to and displayed on display(s) 164.

Temporal Anti-Aliasing Process

Figure 5:
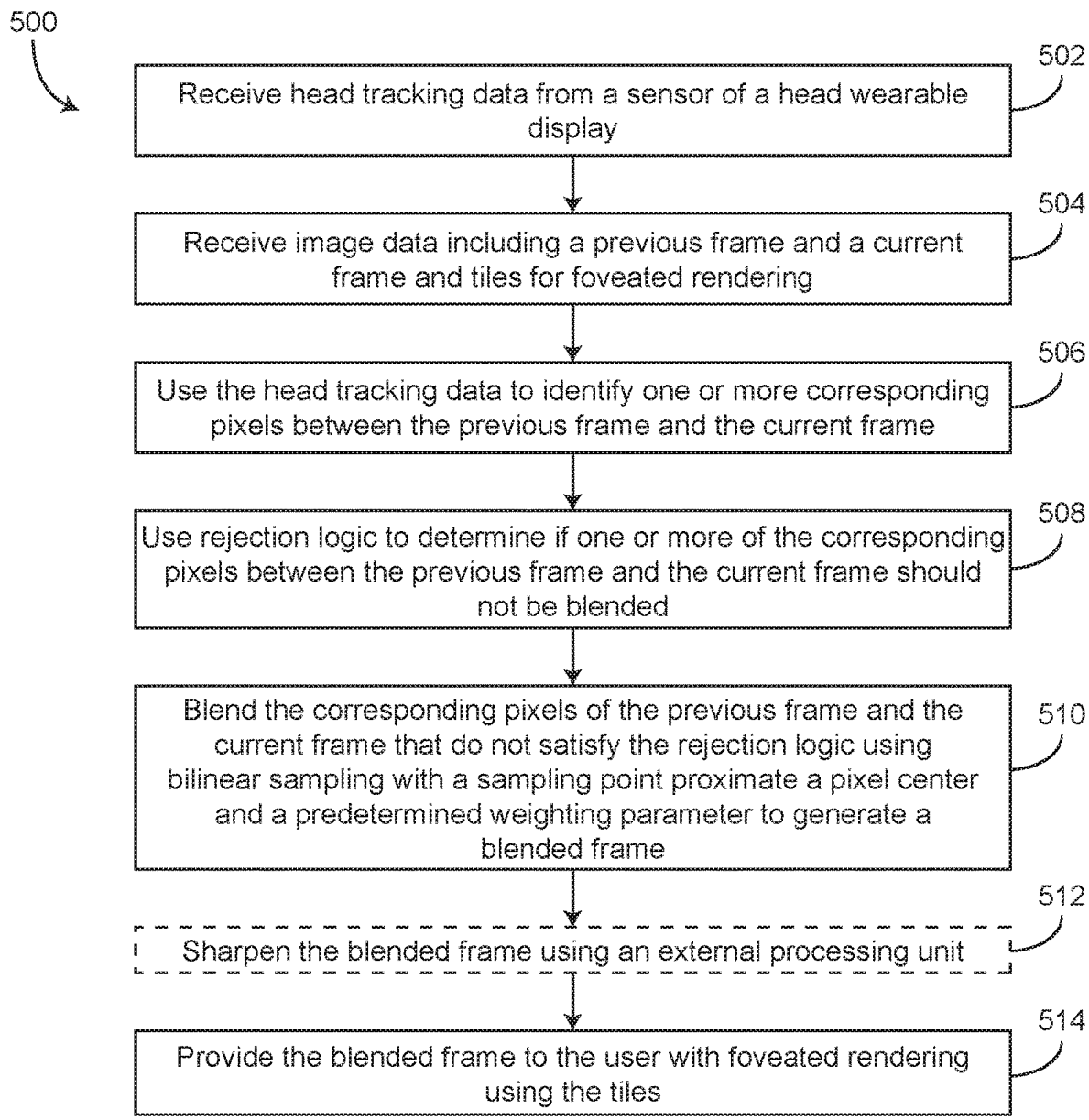
FIG. 5 is a flow diagram of a process for performing temporal anti-aliasing, according to some embodiments.

Referring particularly to FIG. 5, a flow 500 for performing temporal anti-aliasing is shown, according to some embodiments. Flow 500 can include operations 502-510 and operation 514, and may optionally include operation 512 (e.g., an optional post-processing sharpening step). Flow 500 can be performed by processing circuitry 116 and/or processing circuitry 117. Flow 500 can be performed to reduce flickering and/or aliasing artifacts that may occur during foveated rendering, particularly for head mounted or head wearable displays. For example, flow 500 can be performed to reduce aliasing that may result from foveated rendering (e.g., in the user's peripheral vision at lower resolution regions). Flow 500 is a computationally efficient temporal anti-aliasing technique that does not require calculation of motion vectors, does not require artificial viewport jittering, does not require complex rejection logic, and may be performed without post-processing sharpening (or, optionally, with post-processing sharpening).

Flow 500 includes receiving head tracking data from a sensor of a head wearable display (operation 502), according to some embodiments. In some embodiments, the sensor is a single sensor or a collection of similar sensors. In some embodiments, the sensor is a gyroscope, an inertial measurement unit, etc., or any other sensor that is configured to measure, detect, obtain, etc., orientation of the head wearable display. In some embodiments, the sensor is pre-existing or part of the infrastructure of the head wearable display. Operation 502 can be performed by processing circuitry 116 or the various components of processing circuitry 116 thereof (e.g., eye tracking 118, error manager 120, tile generator 122, image renderer 124, etc.). In some embodiments, the sensor is configured to obtain head tracking data (e.g., head tracking data 150) in real-time of the head-wearable display. The sensor(s) may be also used for providing virtual reality, augmented reality, or mixed reality imagery (e.g., in a render engine, a game engine, etc.), in addition to being used for the temporal anti-aliasing techniques described herein.

Flow 500 includes receiving image data including a previous frame and a current frame and tiles for foveated rendering (operation 504), according to some embodiments. In some embodiments, operation 504 is performed by image renderer 124. Image renderer 124 can receive image data to be displayed on a display (e.g., a display screen, a combiner, etc.) from a game engine, a render engine, etc. In some embodiments, image renderer 124 is configured to use the image data received and tiles received from tile generator 122 for foveated rendering.

Flow 500 includes using the head tracking data to identify one or more corresponding pixels between the previous frame and the current frame of the image data (operation 506), according to some embodiments. In some embodiments, the head tracking data is the data received from the sensor(s) in operation 502. In some embodiments, the head tracking data is received from the sensor(s) in real-time. For example the head tracking data may indicate an orientation and/or position of the user's head. In some embodiments, operation 506 is performed by image renderer 124, or more specifically, by frame blender 134. Frame blender 134 may record the orientation and/or position of the user's head at a current time or a first time associated with the current frame and at a previous time or second time associated with the previous frame. In some embodiments, frame blender 134 determines a change in the orientation and/or position of the user's head between the time associated with the previous frame and the time associated with the current frame to determine a correspondence or to track on or more pixels. For example, frame blender 134 can determine that an arbitrary pixel in the previous frame corresponds to a different pixel in the current frame using the head tracking data or the change in the user's head orientation and/or position. Operation 506 can be performed by frame blender 134 for multiple of the pixels of the previous and the current frame.

Flow 500 includes using rejection logic to determine if one or more of the corresponding pixels (e.g., as determined in operation 506) between the previous frame and the current frame should not be blended (operation 508), according to some embodiments. In some embodiments, operation 508 is performed by image renderer 124 and rejection logic 138. For example, the image renderer 124 may use a color-only based rejection logic 138 without accounting for depth. In some embodiments, rejection logic 138 uses color data of the previous image/frame and the current image/frame to determine which of the corresponding pixels should not be blended or merged. In some embodiments, using color-only rejection logic as opposed to color and depth rejection logic reduces processing requirements of the temporal anti-aliasing technique.

Flow 500 includes blending the corresponding pixels of the previous frame and the current frame that do not satisfy the rejection logic using bilinear sampling with a sampling point proximate a pixel center and a predetermined weighting parameter to generate a blended frame (operation 510), according to some embodiments. In some embodiments, the predetermined weighting parameter identifies a blend weight of the current frame relative to the previous frame. In some embodiments, by using the predetermined weighting parameter and the bilinear sampling with the sampling point proximate the pixel center, flicker and/or aliasing artifacts are reduced, with the tradeoff of the imagery being blurred. In some embodiments, a preferred blend weight is approximately 0.2.

It should be understood that "blending" as used herein can refer to any image processing operation that uses pixels, superpixels, collections of pixels, texels, etc., of one or more frames or images (e.g., images of a video, a previous buffer frame and a current buffer frame, etc.) to produce a merged frame. In some embodiments, "blending" refers to mixing, combining, merging, compositing, etc., one or more images to generate a single frame. In some embodiments, the frame or image that is generated as a result of the blending operation is a combination of corresponding pixel values of the one or more frames or images (e.g., the previous and the current frame). "Blending" may refer to any operation that uses pixel information from one or more frames to generate a single frame using the pixel information.

Flow 500 includes sharpening the blended frame using an external processing unit (operation 512), according to some embodiments. In some embodiments, operation 512 is performed by processing circuitry 117 and post-processing 140. In some embodiments, operation 512 is optional. For example, the blended frame may be sharpened before being rendered, displayed, provided, etc., on the head wearable display.

Flow 500 includes providing the blended frame to the user with foveated rendering using the tiles (operation 514), according to some embodiments. In some embodiments, operation 514 is performed by image renderer 124 and/or display(s) 164. For example, image renderer 124 may provide or generate rendered image 130 for display on display(s) 164 to thereby perform operation 514. In some embodiments, if operation 512 is performed, display(s) 164 are configured to receive rendered image 131 from processing circuitry 117 and provide rendered image 131 (e.g., the sharpened image) to perform operation 514.

The systems and methods described herein for temporal anti-aliasing advantageously use head tracking data to identify corresponding pixels (as opposed to calculating motion vectors), use natural jitter of the measured head orientation (as opposed to introducing artificial viewport jittering), use color-only based rejection logic, and do not require post-processing sharpening (which may optionally be performed). All of these features may improve processing speeds and reduce computational complexity associated with performing the temporal anti-aliasing techniques. In some embodiments, the temporal anti-aliasing technique described herein incurs a cost of approximately 0.4 to 0.5 milliseconds of additional processing time.

Server System

Figure 3:
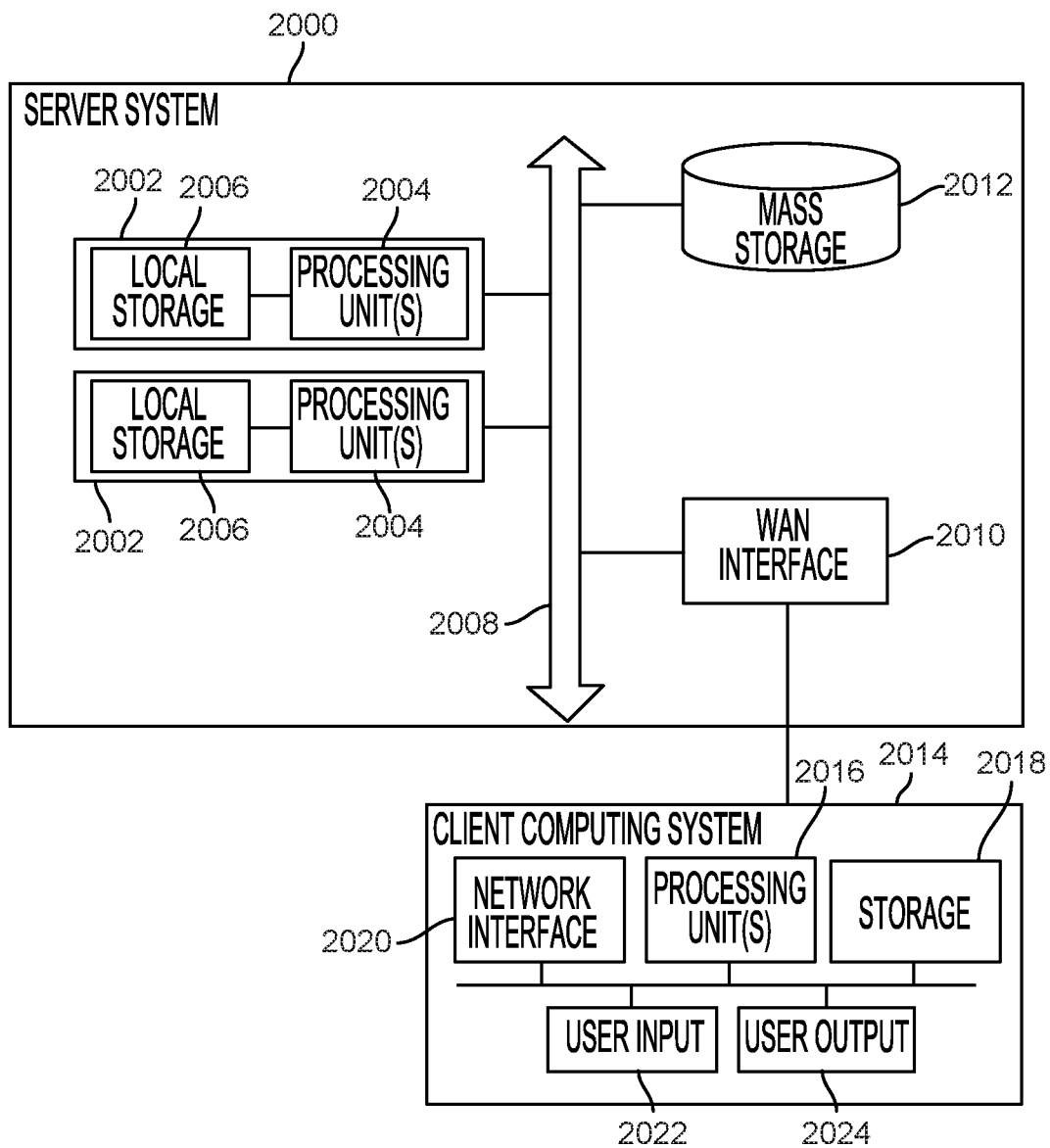
FIG. 3 is a block diagram of a computing environment that the systems of FIGS. 1 and 2 can be implemented in, according to some embodiments.

Various operations described herein can be implemented on computer systems. FIG. 3 shows a block diagram of a representative server system 2000 and client computing system 2014 usable to implement one or more embodiments of the present disclosure. Server system 2000 or similar systems can implement services or servers described herein or portions thereof. Client computing system 2014 or similar systems can implement clients described herein. Each of systems 100, 200 and others described herein can incorporate features of systems 2000, 2014.

Server system 2000 can have a modular design that incorporates a number of modules 2002 (e.g., blades in a blade server); while two modules 2002 are shown, any number can be provided. Each module 2002 can include processing unit(s) 2004 and local storage 2006.

Processing unit(s) 2004 can include a single processor, which can have one or more cores, or multiple processors. Processing unit(s) 2004 can include a general-purpose primary processor as well as one or more special-purpose co-processors such as graphics processors, digital signal processors, a personal computer, server, or the like. Some or all processing units 2004 can be implemented using customized circuits, such as application specific integrated circuits (ASICs) or field programmable gate arrays (FPGAs). Such integrated circuits execute instructions that are stored on the circuit itself. Processing unit(s) 2004 can execute instructions stored in local storage 2006. Any type of processors in any combination can be included in processing unit(s) 2004.

Local storage 2006 can include volatile storage media (e.g., conventional DRAM, SRAM, SDRAM, or the like) and/or non-volatile storage media (e.g., magnetic or optical disk, flash memory, or the like). Storage media incorporated in local storage 2006 can be fixed, removable or upgradeable as desired. Local storage 2006 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 2004 need at runtime. The ROM can store static data and instructions that are needed by processing unit(s) 2004. The permanent storage device can be a non-volatile read-and-write memory device that can store instructions and data even when module 2002 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

Local storage 2006 can store one or more software programs to be executed by processing unit(s) 2004, such as an operating system and/or programs implementing various server functions such as functions of the system 100, or any other system described herein, or any other server(s) associated with the system 100 or any other system described herein.

"Software" refers generally to sequences of instructions that, when executed by processing unit(s) 2004 cause server system 2000 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 2004. Software can be implemented as a single program or a collection of separate programs or program modules that interact as desired. From local storage 2006 (or non-local storage described below), processing unit(s) 2004 can retrieve program instructions to execute and data to process in order to execute various operations described above.

In some server systems 2000, multiple modules 2002 can be interconnected via a bus or other interconnect 2008, forming a local area network that supports communication between modules 2002 and other components of server system 2000. Interconnect 2008 can be implemented using various technologies including server racks, hubs, routers, etc.

A wide area network (WAN) interface 2010 can provide data communication capability between the local area network (interconnect 2008) and a larger network, such as the Internet. Conventional or other activities technologies can be used, including wired (e.g., Ethernet, IEEE 802.3 standards) and/or wireless technologies (e.g., Wi-Fi, IEEE 802.11 standards).

Local storage 2006 can provide working memory for processing unit(s) 2004, providing fast access to programs and/or data to be processed while reducing traffic on interconnect 2008. Storage for larger quantities of data can be provided on the local area network by one or more mass storage subsystems 2012 that can be connected to interconnect 2008. Mass storage subsystem 2012 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 2012. Additional data storage resources may be accessible via WAN interface 2010 (potentially with increased latency).

Server system 2000 can operate in response to requests received via WAN interface 2010. For example, one of modules 2002 can implement a supervisory function and assign discrete tasks to other modules 2002 in response to received requests. Conventional work allocation techniques can be used. As requests are processed, results can be returned to the requester via WAN interface 2010. Such operation can generally be automated. WAN interface 2010 can connect multiple server systems 2000 to each other, providing scalable systems capable of managing high volumes of activity. Conventional or other techniques for managing server systems and server farms (collections of server systems that cooperate) can be used, including dynamic resource allocation and reallocation.

Server system 2000 can interact with various user-owned or user-operated devices via a wide-area network such as the Internet. An example of a user-operated device is shown in FIG. 20 as client computing system 2014. Client computing system 2014 can be implemented, for example, as a consumer device such as a smartphone, other mobile phone, tablet computer, wearable computing device (e.g., smart watch, eyeglasses), desktop computer, laptop computer, and so on.

For example, client computing system 2014 can communicate via WAN interface 2010. Client computing system 2014 can include conventional computer components such as processing unit(s) 2016, storage device 2018, network interface 2020, user input device 2022, and user output device 2024. Client computing system 2014 can be a computing device implemented in a variety of form factors, such as a desktop computer, laptop computer, tablet computer, smartphone, other mobile computing device, wearable computing device, or the like.

Processor 2016 and storage device 2018 can be similar to processing unit(s) 2004 and local storage 2006 described above. Suitable devices can be selected based on the demands to be placed on client computing system 2014; for example, client computing system 2014 can be implemented as a "thin" client with limited processing capability or as a high-powered computing device. Client computing system 2014 can be provisioned with program code executable by processing unit(s) 2016 to enable various interactions with server system 2000 of a message management service such as accessing messages, performing actions on messages, and other interactions described above. Some client computing systems 2014 can also interact with a messaging service independently of the message management service.

Network interface 2020 can provide a connection to a wide area network (e.g., the Internet) to which WAN interface 2010 of server system 2000 is also connected. Network interface 2020 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 2022 can include any device (or devices) via which a user can provide signals to client computing system 2014; client computing system 2014 can interpret the signals as indicative of particular user requests or information. User input device 2022 can include any or all of a keyboard, touch pad, touch screen, mouse or other pointing device, scroll wheel, click wheel, dial, button, switch, keypad, microphone, and so on.

User output device 2024 can include any device via which client computing system 2014 can provide information to a user. For example, user output device 2024 can include a display to display images generated by or delivered to client computing system 2014. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 2024 can be provided in addition to or instead of a display. Examples include indicator lights, speakers, tactile "display" devices, printers, and so on.

Configuration of Illustrative Embodiments

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method for providing imagery to a user on a display, the method comprising:

receiving head tracking data;

using the head tracking data to determine a change in an orientation of a user's head;

determining which of one or more pixels of a previous frame and corresponding pixels of a current frame are to be blended, wherein the corresponding pixels of the current frame are identified using the change in the orientation of the user's head and rejection logic to determine which of the one or more pixels of the previous frame and the corresponding pixels of the current frame are to be blended, the rejection logic using color data of the pixels of the previous frame and the current frame without filtering a depth image to reject blending of one or more pixels of the previous frame and the current frame;

blending the pixels of the previous frame with the corresponding pixels of the current frame;

providing foveated imagery to the user on the display using the blended pixels and a plurality of tiles.

2. The method of claim 1, wherein the foveated imagery is provided to the user on the display without using artificial viewport jittering.

3. The method of claim 1, wherein determining which of the one or more pixels of the previous frame and the current frame are to be blended comprises using the rejection logic to determine which of the one or more pixels of the previous frame and the corresponding pixels of the current frame are not to be blended.

4. The method of claim 1, wherein the color data is RGB color data or YCoCg color data.

5. The method of claim 1, wherein the rejection logic uses the color data without the depth image to determine one or more pixels of the previous frame and the current frame that are not to be blended, the classification based on whether the blob is within the mask.

6. The method of claim 1, further comprising:

sharpening the foveated imagery before providing the foveated imagery to the user on the display, wherein the foveated imagery is sharpened on an external data processing unit.

7. A head mounted display comprising:

processing circuitry configured to:

use a change in an orientation of a user's head as measured by a head tracking sensor to identify corresponding pixels between a previous frame and a current frame;

determine which of the corresponding pixels between the previous frame and the current frame are to be blended using rejection logic, the rejection logic using color data of the corresponding pixels of the previous frame and the current frame without filtering a depth image to reject blending of one or more of the corresponding pixels of the previous frame and the current frame;

provide a blended frame using the corresponding pixels of the previous frame and the current frame that are determined to be blended; and provide foveated imagery on a display to the user using the blended frame.

8. The head mounted display of claim 7, wherein the foveated imagery is provided to the user on the display without using artificial viewport jittering.

9. The head mounted display of claim 7, wherein the rejection logic uses the color data of the previous frame and the current frame to determine one or more pixels of the previous frame and the current frame that are not to be blended.

10. The head mounted display of claim 9, wherein the color data is RGB color data or YCoCg color data.

11. The head mounted display of claim 9, wherein the rejection logic uses the color data without depth to determine one or more pixels of the previous frame and the current frame that are not to be blended.

12. The head mounted display of claim 7, further comprising a data processing unit separate from the processing circuitry, wherein the data processing unit is configured to sharped one or more portions of the blended frame.

13. A head wearable display system comprising:

a head tracking sensor configured to measure a change in orientation of a user's head;

a wearable display configured to provide imagery to a user's eye; and processing circuitry configured to:

determine which of one or more pixels of a previous frame and corresponding pixels of a current frame are to be blended using rejection logic to determine which of the one or more pixels of the previous frame and the corresponding pixels of the current frame are to be blended, the rejection logic using color data of the pixels of the previous frame and the current frame without filtering a depth image to reject blending of one or more pixels of the previous frame and the current frame;

blend the corresponding pixels of the previous frame and the current frame using the change in the orientation of the user's head to generate a first frame; and provide foveated imagery on the wearable display to the user using the first frame.

14. The head wearable display system of claim 13, wherein the foveated imagery is augmented reality imagery or virtual reality imagery.

15. The head wearable display system of claim 13, wherein the foveated imagery is provided to the user on the wearable display without using artificial viewport jittering.

16. The head wearable display system of claim 13, wherein the processing circuitry uses color of the corresponding pixels without using depth of the previous frame and the current frame to determine which of the corresponding pixels are to be blended.

17. The head wearable display system of claim 13, wherein the processing circuitry uses a sampling point proximate pixel center and a predetermined blend weight to reduce a blur of the first frame.

* * * * *